United States Patent
Koeber

[15] 3,698,253
[45] Oct. 17, 1972

[54] POWER TRANSMISSION MECHANISM
[72] Inventor: Henry J. Koeber, Deerfield, Ill.
[73] Assignee: Bell & Howell Company, Chicago, Ill.
[22] Filed: Sept. 2, 1969
[21] Appl. No.: 854,474

[52] U.S. Cl..................................74/129, 350/187
[51] Int. Cl..................................F16h 27/02
[58] Field of Search........74/129, 128, 130, 142, 116, 74/112, 117; 350/187; 95/45

[56] References Cited

UNITED STATES PATENTS

| | | | |
|---|---|---|---|
| 3,246,590 | 4/1966 | Jenkins | 95/45 |
| 3,260,184 | 7/1966 | Pagel et al. | 95/45 |
| 3,404,616 | 10/1968 | Koeber, Jr. | 95/45 |
| 2,769,641 | 11/1956 | Brown | 275/5 |
| 3,107,544 | 10/1963 | Nichols et al. | 74/157 |
| 2,384,110 | 9/1945 | Malmquist | 74/116 |
| 2,868,026 | 1/1959 | Finehout et al. | 74/128 |
| 2,995,061 | 8/1961 | Briskin et al. | 350/187 |
| 3,106,125 | 10/1963 | Martiix et al. | 350/187 |
| 3,157,881 | 11/1964 | Jenkins et al. | 350/187 |

FOREIGN PATENTS OR APPLICATIONS 1,171,226  12/1960  Germany

*Primary Examiner*—William F. O'Dea
*Assistant Examiner*—Wesley S. Ratliff, Jr.
*Attorney*—Finnegan, Henderson & Farabow

[57] ABSTRACT

A power transmission mechanism for converting continuous rotary motion into intermittent rotation is provided. The power transmission mechanism is used to axially move at least one lens element of a zoom lens in a forward or backward direction with a smooth, uniform zooming action. The power transmission mechanism comprises a reversibly rotatable body which transmits power from a continuously rotating power source, and has a plurality of ratchet teeth on its outer periphery. A ratchet pawl is mounted at a point spaced from the ratchet teeth of the reversibly rotatable body and is movable between an operative position where the ratchet pawl is engageable with the ratchet teeth and an inoperative position where the ratchet pawl cannot engage with the ratchet teeth. Operating means are connected to the ratchet pawl to cause the ratchet pawl to intermittently engage the ratchet teeth and rotate the reversibly rotatable body.

20 Claims, 6 Drawing Figures

PATENTED OCT 17 1972

INVENTOR
HENRY J. KOEBER

Finnegan, Henderson & Farabow

ATTORNEYS

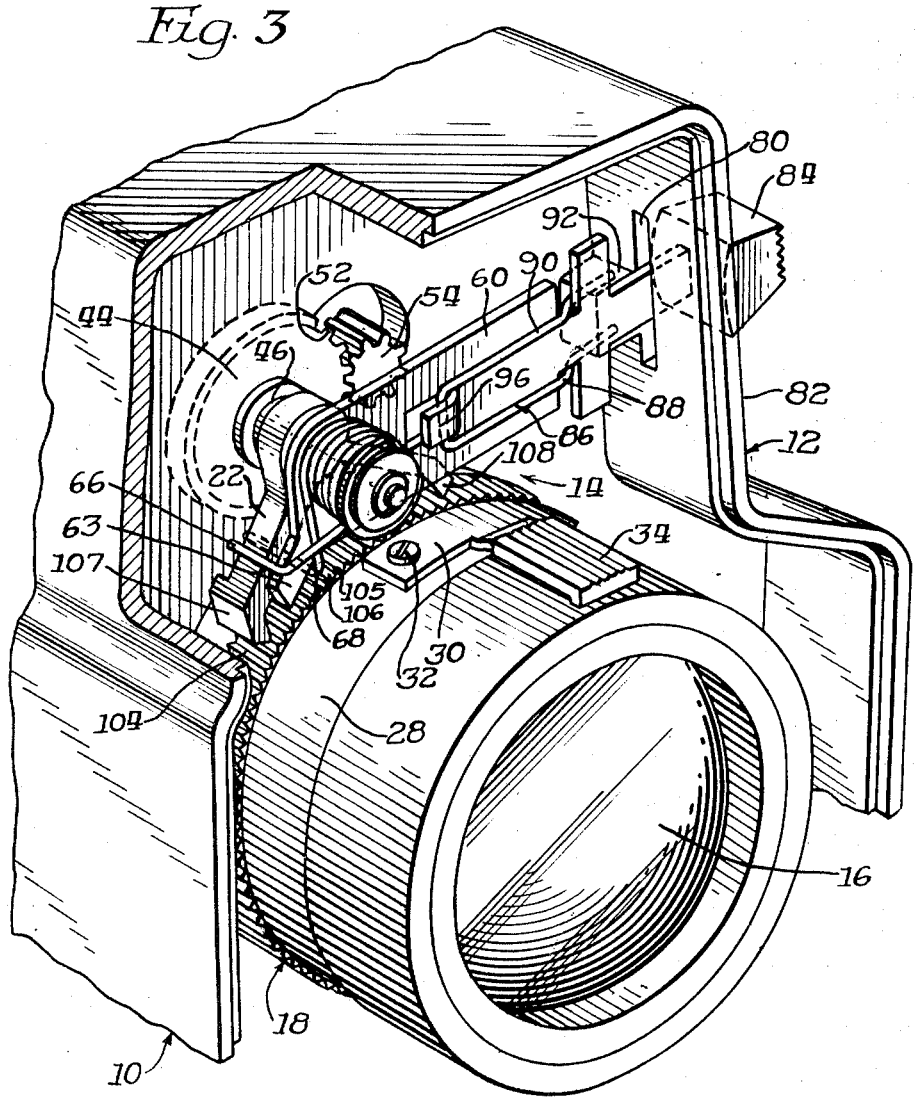

FIG. 3 is a perspective view of another embodiment of the power transmission mechanism of this invention;

FIG. 4 is a partial sectional view of the power transmission mechanism of FIG. 3;

Figure 1:
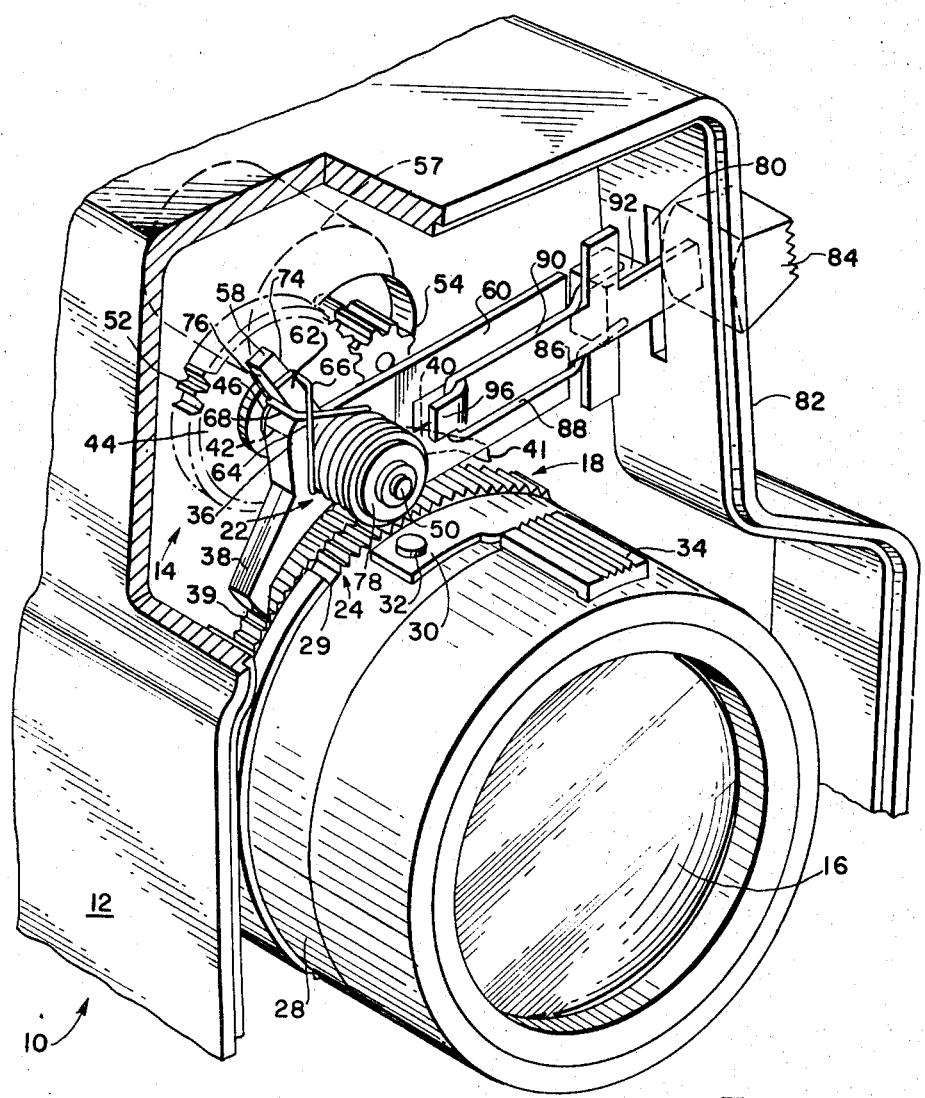

With reference particularly to FIG. 1, the invention is here embodied in a camera, designated generally by numeral 10, comprising a housing generally 12 on which is mounted a power transmission mechanism generally indicated by numeral 14. The power transmission mechanism is driven by a rotating drive means, such as camera drive motor 57, and converts the continuous rotary motion of the rotating drive means into intermittent motion. The power transmission mechanism powers a zoom lens system which can be coupled to the view finder assembly of the camera by conventional means (not shown) so that the camera operator will always observe in the view finder exactly the same scene which is being photographed at any given point throughout the entire range of adjustment of the zoom lens assembly.

Figure 2:
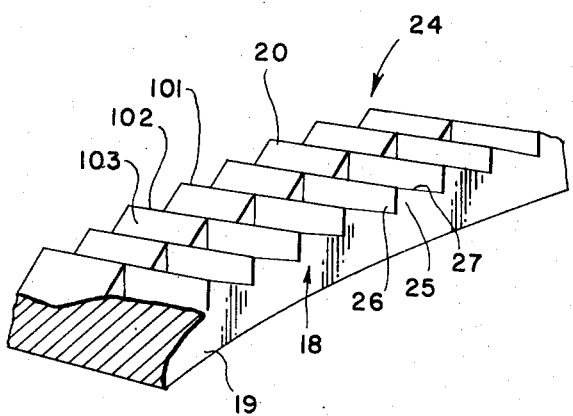
Figure 5:
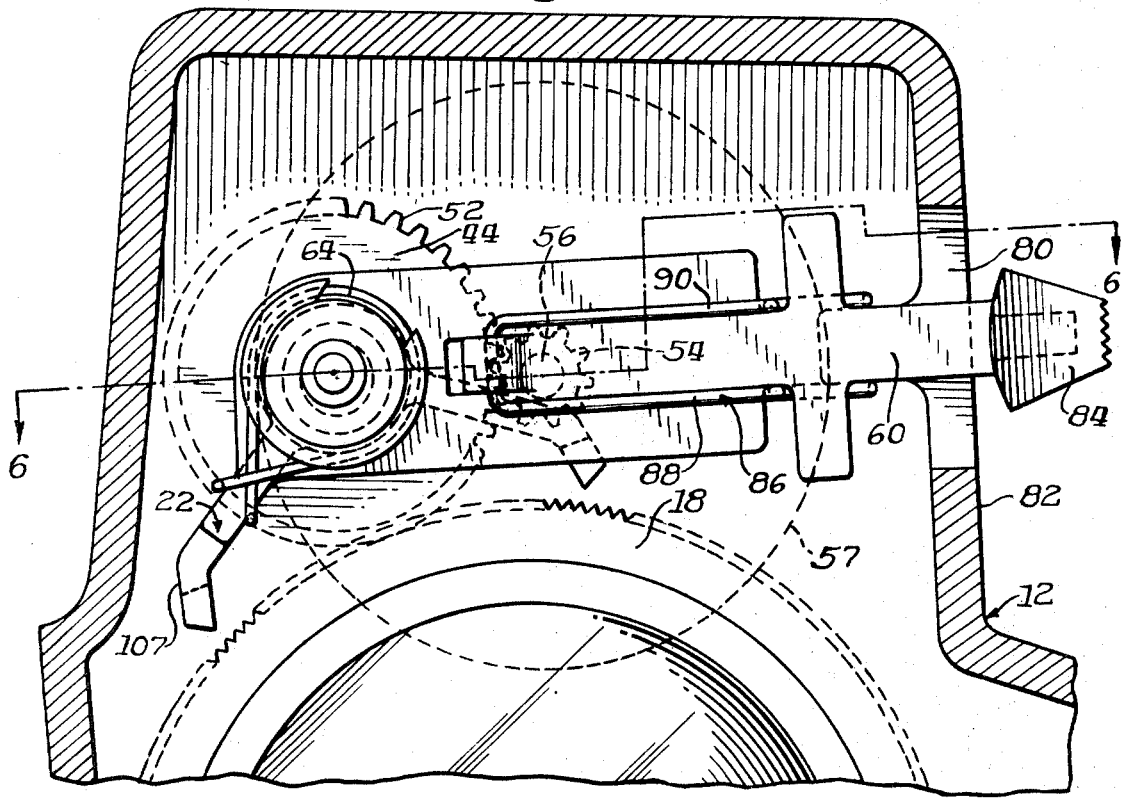
FIG. 5 is a partial sectional view of FIG. 4 and showing the reciprocating drive means in inoperative engagement with the reversibly rotatable body.
Figure 6:
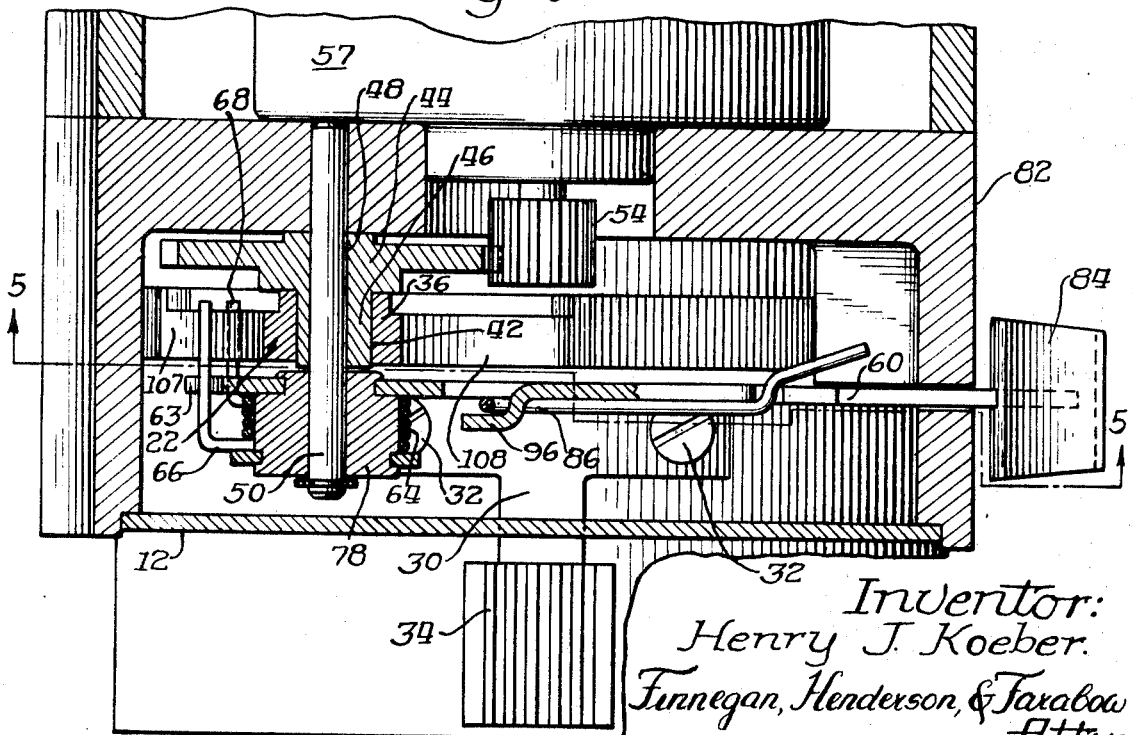
FIG. 6 is a partial horizontal section taken along lines 6—6 of FIG. 5 showing the means for imparting the reciprocative motion to the reciprocating drive means in detail.

In accordance with the invention, a reversibly rotatable body is provided to transmit power from the continuously rotating drive means. As here embodied, and as illustrated in FIGS. 1 and 2, the reversible rotatable body is a rotatable wheel, generally 18, and is connected to a movable lens element 16 by a zoom ring 28 which is coupled to rotatable wheel 18 by conventional means, such as key (not shown) secured to the zoom ring 28 and engaged within a helical groove (not shown) located on the inner periphery of rotatable wheel 18. Rotatable wheel 18 transmits power from camera drive motor 57 and rotates in an intermittent manner. Rotation of rotatable wheel 18 therefore results in an axial movement of zoom ring 28 and a corresponding axial movement of lens element 16.

Zoom ring 28 has a manually operable control lever 30 which is mounted on the outer periphery of the zoom ring by conventional means, such as screws 32. Control lever 30 extends axially outwardly from zoom ring 28 and passes through an opening (not shown) in housing 12 (FIG. 1) so that a knob 34 on control lever 30 can be manually engaged to rotate zoom ring 28. Control lever 30 is thus a manual control means connected to the rotatable wheel.

In accordance with the invention, a track portion is provided integral with the rotatable body. As here embodied, and as shown in FIGS. 1 and 2, the track portion is comprised of a plurality of ratchet teeth, generally 24, on the outer periphery of rotatable wheel 18. As will be understood by those skilled in the art, the track portion can be any type of a frictional surface and is not limited to ratchet teeth. In the embodiment illustrated in FIGS. 1 and 2, rotatable wheel 18 contains a front cylindrical portion 19 having a row of identical buttress shaped teeth 25, each tooth 25 having a substantially radially extending face 26 and an inclined face 27 which extends in a clockwise direction (as viewed from the front of the camera) from the top of the tooth to the body of the rotatable wheel 18. At the left end of the row of teeth 25 a gap or skip tooth 29 is provided (FIG. 1).

Rotatable wheel 18 also contains a rear cylindrical portion 20 having a row of identical buttress shaped teeth 101, each tooth 101 having a substantially radially extending face 102 and an inclined face 103 which extends from the top of the tooth in a counterclockwise direction to the body of rotatable wheel 18. Buttress teeth 101 thus face in a direction opposite to the direction of buttress teeth 25. At the right end of the row of teeth 101 a gap or skip tooth 29 is provided.

Buttress shaped teeth 25 on front cylindrical portion 19 can be engaged by the reciprocating drive means to rotate rotatable wheel 18 in a clockwise direction and buttress shaped teeth 101 on rear cylindrical portion 20 can be engaged by the reciprocating drive means to rotate rotatable wheel 18 in a counterclockwise direction.

In an alternative embodiment of the shape of the ratchet teeth, and as shown in FIGS. 3 and 4, a single row of ratchet teeth 104 is provided with each ratchet tooth 104 being V-shaped and containing two inclined faces which extend downwardly from the top of the tooth in opposite directions. Each tooth 104 contains an inclined face 105 which extends from the top of the tooth in a clockwise direction to the body of rotatable wheel 18 and an inclined face 106 which extends from the top of the tooth in a counterclockwise direction to the body of rotatable wheel 18. The inclined faces 105 and 106 are of equal length and form angles of equal degree with a radial line passing through the top of the tooth. Thus, each ratchet tooth 104 can be engaged by the reciprocating drive means on either of the tooth's inclined faces.

In accordance with the invention, reciprocating drive means mounted at a point spaced from the track portion of the reversibly rotatable body is provided and is movable between an operative position where the reciprocating drive means is engageable with the track portion and an inoperative position where the reciprocating drive means cannot engage the track portion. As here embodied and as illustrated in FIG. 1, this means comprises a ratchet pawl, generally indicated by numeral 22, which is slidably mounted on an eccentric hub 46 of a gear 44 and which can rotate rotatable wheel 18 with an intermittent motion. Ratchet pawl 22 has a hub 36 and extending radially outwardly from hub 36 is an extending or pawl arm 40 that can be intermittently engaged with teeth 25 on front cylindrical portion 19 of rotatable wheel 18. Pawl arm 40 has an extension 41 which overlies front cylindrical portion 19 and which enables the pawl arm to be engaged only with buttress teeth 25. Ratchet pawl 22 additionally contains a second radially extending pawl arm 38 that is intermittently engageable with teeth 101 on rear cylindrical portion 20 of rotatable wheel 18. Pawl arm 38 has an extension 39 which overlies rear cylindrical portion 20 and which enables the pawl arm to be engaged only with teeth 101. Hub 36 of ratchet pawl 22 contains a central axial bore 42 to enable ratchet pawl 22 to be slidably connected to the means for imparting the reciprocative motion to the ratchet pawl.

In the embodiment shown in FIG. 3, wherein there is only one row of V-shaped teeth 104 having inclined faces which face in opposite directions, the ratchet

POWER TRANSMISSION MECHANISM

This invention relates to a power transmission mechanism, and more particularly to a mechanism for converting continuous rotary motion into intermittent rotation.

A great number of power transmission mechanisms which transmit power from a power source are known in the prior art and in recent years these mechanisms have been developed for use in a zoom lens system such as those found in motion picture and television cameras. A zoom lens system has at least one lens element which can be moved axially in a forward or backward direction. The power transmission mechanisms that transmit power from a rotary power source usually require a space consuming gear reduction train. For example, power transmission mechanisms that are used to move the movable lens element of a zoom lens system to vary the magnification of the lens system generally require a complex gear and linkage system that employs a rotatable gear which is engageable with one of two racks. The prior art has recognized that a space saving power transmission mechanism is desirable in general and is particularly desirable for obtaining smooth, uniform zooming action that provides a sharp image without blur due to the zooming action. The prior art has continually sought to improve the power transmission mechanisms to achieve this result.

Accordingly, this invention provides a new and improved power transmission mechanism that occupies a minimum of space and efficiently transmits power while converting rotary motion of rotating power source into an intermittent motion. The power transmission mechanism of this invention can be used in a zoom lens system to permit the obtaining of a smooth, uniform zooming action and a sharp image without blur due to the zooming action.

Additional advantages of the invention will be set forth in part in the description which follows, and in part will be obvious from the description, or may be learned by practice of this invention. The advantages are realized and attained by means of the instrumentalities and combinations particularly pointed out in the appended claims.

In accordance with its purpose, as embodied and broadly described, the power transmission mechanism of this invention for converting the continuous rotating motion of a rotating drive means into intermittent motion comprises a reversibly rotatable body, a track portion integral with the rotatable body, reciprocating drive means mounted at a point spaced from the track portion of the rotatable body and movable between an operative position where the reciprocating drive means is engageable with the track portion and an inoperative position where the reciprocating drive means cannot engage the track portion, and operating means driven by the rotating drive means and connected to the reciprocating drive means for imparting reciprocative motion to the reciprocating drive means to cause the reciprocating drive means to intermittently engage the track portion and rotate the reversibly rotatable body.

Preferably, the transmission mechanism of this invention is used in a zoom lens system and the reversibly rotatable body is a rotatable wheel connected to a movable lens element of the zoom lens system for moving the lens element axially when the wheel is rotated.

Actuator means are preferably connected to the reciprocating drive means for moving the reciprocating drive means between the operative position and the inoperative position and comprise an alignment arm extending from the reciprocating drive means; an actuator lever connected to the reciprocating drive means for manually moving the reciprocating drive means between the operative position and inoperative position; an actuator arm extending outwardly from the actuator lever and aligned with the alignment arm; and resilient means for holding the actuator arm and the alignment arm in alignment so that movement of the actuator lever will be transmitted through the resilient means to the alignment arm. It is also preferred that a second resilient means hold the actuator lever in the inoperative position.

The alignment arm may also act to intermittently engage the rotatable wheel to rotate the wheel. Preferably, however, the reciprocating drive means includes at least one extending arm that intermittently engages the rotatable wheel to rotate the rotatable wheel. Desirably, the track portion is comprised of a plurality of ratchet teeth on the outer periphery of the rotatable wheel and the reciprocating drive means comprises a ratchet pawl which contains the extending arm that intermittently engages the rotatable wheel. The ratchet pawl preferably has a second extending arm that intermittently engages the rotatable wheel to rotate the wheel. The ratchet teeth may comprise a first row of buttress shaped teeth facing in one direction to be engaged by one of the extending arms and a second row of buttress shaped teeth facing in an opposite direction to be engaged by the other extending arm. Alternatively, the ratchet teeth may comprise a single row of V-shaped teeth, each tooth having two inclined faces of equal length, with one extending arm engaging the teeth on one side and the other extending arm engaging the teeth on the other side.

The operating means driven by the rotating drive means for imparting the reciprocating motion preferably includes means connected to the rotating drive means for converting the rotational motion of the rotating drive means into the reciprocating motion. In the preferred embodiments the means for converting the rotational motion of the rotating drive means into the reciprocating motion includes an eccentric hub with the reciprocating drive means being slidably mounted on the hub through a central axial bore in the reciprocating drive means.

The invention consists in the novel parts, constructions, arrangements, combinations, and improvements shown and described. The accompanying drawings, which are incorporated in and constitute a part of this specification, illustrate several of the embodiments of the invention, and, together with the description, serve to explain the principles of the invention.

It is to be understood that both the foregoing general description and the following detailed description are exemplary and explanatory but are not restrictive of the invention.

Of the drawings:

FIG. 1 is a perspective view of the power transmission mechanism of this invention mounted in a camera housing;

FIG. 2 is an enlarged perspective view of the reversibly rotatable body shown in FIG. 1;

pawl contains two radially extending pawl arms 107 and 108, with pawl arm 107 intermittently engaging teeth 104 on inclined face 105 to drive the wheel in a counterclockwise direction and pawl arm 108 intermittently engaging the teeth 104 on inclined face 106 to drive the wheel in a clockwise direction.

In accordance with the invention, operating means driven by the rotating drive means and connected to the reciprocating drive means are provided for imparting reciprocative motion to the reciprocating drive means to cause the reciprocating drive means to intermittently engage the track portion and rotate the reversibly rotatable body. As here embodied, and as illustrated in FIGS. 1 and 3–6, the operating means comprise the gear 44 having an eccentric bearing hub 46 and a pinion gear 54 which is engaged with gear 44. A bore 48 passes axially through gear 44 to enable gear 44 to rotate about a shaft 50 mounted on housing 12. Gear 44 has teeth 52 which are always engaged with pinion gear 54. Pinion gear 54 is fastened about and rotated by a camera motor shaft 56 of camera drive motor 57 shown in FIGS. 5 and 6. Ratchet pawl 22 is slidably connected to gear 44 by being slidably mounted on eccentric bearing hub 46. Gear 44 is thus connected to the rotating drive means and is a means for converting the rotational motion of camera drive motor 57 into a reciprocating motion.

In accordance with one embodiment of the invention, actuator means connected to the reciprocating drive means are provided for moving the reciprocating drive means between the operative position and the inoperative position.

As here embodied, and as illustrated in FIG. 1, this means comprises an alignment arm extending radially outwardly from ratchet pawl 22, such as third arm 58, an actuator lever 60 connected to reciprocating drive means 22 for manually moving the reciprocating drive means between the operative position and the inoperative position, an actuator arm 62 extending outwardly from actuator lever 60 and aligned with the alignment arm, and resilient means, such as a spring 64 for holding actuator arm 62 and third arm 58 is alignment so that movement of actuator lever 60 will be transmitted through the resilient means to the alignment arm.

Spring 64 has two legs 66 and 68 positioned on opposite sides 74 and 76 of third arm 58 of ratchet pawl 22. Spring 64 is positioned on a bushing 78 which is mounted on shaft 50 forwardly of gear 44. Actuator lever 60 is secured to bushing 78 and the control lever, spring, and bushing 78 are pivotable about shaft 50. Actuator lever 60 extends radially outwardly from bushing 78 and passes through an opening 80 in a side 82 of housing 12. A knob 84 is mounted on actuator lever 60 for depressing or raising the lever to selectively engage pawl arms 38 and 40 with the ratchet teeth on rotatable wheel 18. A second spring 86 is mounted on a projection 96 on actuator lever 60 and has a pair of legs 88 and 90 positioned on opposite sides of a boss 92 of camera housing 12 to hold actuator lever 60 in a centered or inoperative position. In this position the pawl arms of ratchet pawl 22 cannot engage ratchet teeth 25 and 101 even if camera motor shaft 56 is in operation.

In an alternative embodiment of the actuator means connected to the reciprocating drive means for moving the reciprocating drive means between the operative and inoperative position, and as shown in FIGS. 3–6, ratchet pawl 22 is provided with only two arms, each of which is engageable with rotatable wheel 18, and one of which is aligned with an actuator arm 63. Ratchet pawl 22 thus contains pawl arm 107 and pawl arm 108, and actuator lever 60 contains an actuator arm 63 which is aligned with pawl arm 107. Pawl arm 107 therefore serves as the alignment arm.

Spring 64 is repositioned on bushing 78 so that actuator arm 63 and pawl arm 107 can be kept in alignment. In this location, the spring forces holding pawl arms 107 and 108 against ratchet teeth 104 are equalized so that the ratchet back action of pawl arms 107 and 108 is not greater than the pushing action during the engagement of pawl arms 107 and 108 with rotatable wheel 18. A positive drive in one direction for each of the pawl arms is, therefore, assured.

In a further alternative embodiment of the power transmission mechanism for use in a camera, means are provided for enabling the zoom lens system to be used as a full-time power zoom. In this embodiment, actuator lever 60 and springs 64 and 86 are not required. Instead, a separate reversible electric motor (not shown) is provided in addition to the camera drive motor. This reversible motor has a reversing electrical switch (not shown) to cause the reversible motor, its motor shaft, on which pinion gear 54 is mounted, and therefore pinion gear 54 and gear 44, to rotate in one direction or the other. The manual control lever 30 may be eliminated also, if desired, as the movable lens element can be zoomed under power at any time as the zoom has its own separate drive motion.

In a further advantageous embodiment of the power transmission mechanism for use in a camera, means are provided for rotating gear 44 at the same frequency as the shutter of the camera. Conventional means are used for synchronizing the frequency of the gear with the frequency of the shutter.

In operation, when it is desired to transmit power to obtain a forward or telescopic adjustment of the zoom lens shown in FIGS. 1 and 2, knob 84 is depressed while the camera motor is running. When knob 84 is depressed, actuator lever 60 and, therefore, actuator arm 62, are rotated in a clockwise direction (when viewed from the front of the camera). The movement of actuator arm 62 in a clockwise direction flexes spring 64 so that spring leg 68 acts on side 76 of third arm 58 to rotate ratchet pawl 22 in a clockwise direction (when viewed from the front of the camera) and thereby press pawl arm 40 into contact with ratchet teeth 25 on rotatable wheel 18. Because the pawl is being eccentrically driven, pawl arm 40 will move back and forth with a reciprocating motion on ratchet teeth 25, thus driving rotatable wheel 18 in a clockwise direction, with a pulsing motion. As the pulses are occurring at a fast rate and move rotatable wheel 18 through only a very small angle per pulse, the result to both the eye as seen in the view finder and the picture as seen when projected, is a smooth zooming action. The clockwise rotation of the rotatable wheel will continue until actuator lever 60 is released which causes spring 86 to return actuator lever 60 to the center or inoperative position and stop the zoom action, or until pawl arm 40 runs out of engagement with the row of teeth 25 into skip tooth 29.

When it is desired to transmit power to obtain a reverse or wide angle adjustment of the zoom lens system, knob 84 is raised while the camera motor is running. When knob 84 is raised actuator lever 60 and, therefore, actuator arm 62 are moved in a counterclockwise direction (when viewed from the front of the camera). The movement of actuator arm 62 in a counterclockwise direction flexes spring 64 so that spring leg 66 acts on side 74 of third arm 58 to rotate ratchet pawl 22 in a counterclockwise direction and thereby press pawl arm 38 into contact with ratchet teeth 101 on rotatable wheel 18. The eccentric drive of ratchet pawl 22 will now move pawl arm 38 with a reciprocating motion on ratchet teeth 101, thus driving rotatable wheel 18 in a counterclockwise direction, with a pulsing action. The zoom action, skip tooth 29, and actuator lever then operate in a manner similar to that described above with respect to the forward movement.

When actuator lever 60 is in an inoperative position, knob 34 of manual control lever 30 can be arcuately moved in either a clockwise or counterclockwise direction to thereby move zoom ring 28 in a corresponding clockwise or counterclockwise direction. This movement of zoom ring 28 will result in a corresponding forward or reverse movement of movable lens element 16. Thus, control lever 30 is a manual control means for moving lens element 16 in opposite axial directions by a manual force applied directly to the manual control means and independent of the ratchet pawl and a zoom action for varying the magnification of the lens system is always achievable whether the camera motor is running or is inoperative.

In the embodiment shown in FIGS. 3–6, wherein actuator arm 63 is aligned with pawl arm 107, the moving of the ratchet pawl into the operating position is obtained in a manner similar to that just described. However, instead of actuator arm 62 flexing spring 64 to move third arm 58 of ratchet pawl 22, actuator arm 63 and spring legs 66 and 68 cooperate to act on pawl arm 107 and to rotate ratchet pawl 22 and move either pawl arm 107 or pawl arm 108 into contact with the ratchet teeth on rotatable wheel 18.

In the embodiment shown in FIGS. 3–6, where only one row of V-shaped teeth 104 is provided, the zoom action is obtained in a manner similar to the embodiment where two rows of oppositely facing buttress teeth are provided. When a forward adjustment is desired, knob 84 is depressed to move actuator arm 63 in a clockwise direction which in turn will rotate ratchet pawl 22 in a clockwise direction and press pawl arm 108 into contact with ratchet teeth 104 to drive rotatable wheel 18 in a clockwise direction. When the zoom action reaches the limit of zoom, the rotatable wheel 18 will stop rotating because it strikes a stop (not shown). If the actuator lever 60 is not released, the angle of the ratchet teeth is such that ratchet pawl arm 108 will jump out of mesh. Therefore, no clutch or other mechanism is needed at the end of the zoom movement. Releasing actuator lever 60 at any time causes spring 86 to return actuator lever 60 to the center or inoperative position, thus stopping the zoom action if the motor is still running.

When a reverse adjustment is desired, knob 84 is raised to move actuator arm 63 in a counterclockwise direction which in turn rotates ratchet pawl 22 in a counterclockwise direction and presses pawl arm 107 into contact with ratchet teeth 104 to drive rotatable wheel 18 in a counterclockwise direction. The zoom action, rotatable wheel stop, ratchet teeth angle and actuator lever then operate in a manner similar to that described with respect to the forward movement of the zoom mechanism.

In the embodiment wherein a full-time power zoom is provided, gear 44 will be driven in either a clockwise or counterclockwise direction, depending on the motor direction. Due to friction between the ratchet pawl 22 and eccentric bearing hub 46, ratchet pawl 22 will rotate in a corresponding direction until the corresponding pawl arm contacts the ratchet teeth. Ratchet pawl 22 will then drive rotatable wheel 18 with a pulsing motion as described above.

In the embodiment wherein gear 44 rotates at the same frequency as the shutter of the camera, it is possible to synchronize the revolutions of the camera shutter with the movement of the movable lens such that the lens zooming action, in either direction, occurs only while the shutter is covering the film aperture during the film pull-down cycle. During the open shutter, or film exposure time, the zooming action of the lens is stationary, resulting in a stationary image on the film. This, in turn, provides a sharper image without blur due to zooming action, which occurs with the conventional continuous zoom system.

Thus, a new and improved power transmission mechanism that can be used with a zoom lens system has been provided to permit the obtaining a smooth, uniform zooming action and a sharp image without blur due to zooming action.

The invention in its broader aspects is not limited to the specific details shown and described, but departures may be made from such details within the scope of the disclosure without departing from the principles of the invention and without sacrificing its chief advantages.

What is claimed is:

1. In an optical instrument having a lens element movable in an axial direction, a reversibly rotatable element connected to said lens element, said lens element being movable in a first axial direction when said rotatable element is rotated in a first rotational direction and in a second axial direction when said rotatable element is rotated in a second rotational direction, and means connecting said reversibly rotatable element to said lens element for converting a rotary motion of said reversibly rotatable element in said first rotational direction to axial motion of the lens element to advance said lens element in said first axial direction and for converting a rotary motion of said reversibly rotatable element in said second rotational direction to axial motion of the lens element to advance said lens element in said second axial direction, the combination therewith comprising:

a. a undirectional continuously rotating drive means;
   b. annular toothed track means affixed to said rotatable element;
   c. ratchet pawl means spaced from said annular toothed track means, said ratchet pawl means including:

i. a first pawl engagement element movable between an operative position in engagement with said annular toothed track means and an inoperative position disengaged from said annular toothed track means, and
ii. a second pawl engagement element movable between an operative position in engagement with said annular toothed track means and an inoperative position disengaged from said annular toothed track means;
d. actuator means connected to said ratchet pawl means for moving a selected one of said first and second engagement elements from its inoperative position into operative position while the other of said first and second engagement elements remains in its inoperative position and for returning said selected one of said first and second engagement elements to its inoperative position, said actuator means having a neutral position in which both said first and second engagement elements are in their inoperative position;
e. an eccentric driven by said drive means for imparting back and forth motion to said ratchet pawl means such that said first pawl engagement element is effective when in its operative position to rotate said reversibly rotatable element intermittently in said first rotational direction and thereby advance said lens element in said first axial direction and such that said second pawl engagement element is effective when in its operative position to rotate said reversibly rotatable element intermittently in said second rotational direction and thereby advance said lens element is said second axial direction; and
f. means continuously biasing said actuator means to said neutral position.

2. The invention of claim 1 wherein said actuator means includes resilient means for normally maintaining said drive means in said inoperative position.

3. The invention of claim 1 wherein said actuator means comprises an actuator lever connected to said track drive means for moving said track drive means between said operative position and said inoperative position.

4. The invention of claim 3 wherein said drive means includes a first extending arm that intermittently engages said drive track means to rotate said rotatable element in a first direction.

5. The invention of claim 4 wherein said drive means includes a second extending arm that intermittently engages said drive track means to rotate said rotatable element in a second direction.

6. The invention of claim 5 wherein said operating means comprises an eccentric rotatably driven by said drive means.

7. The invention of claim 6 wherein said actuator lever is resiliently connected to said track drive means.

8. In an optical instrument having a lens element movable in an axial direction, and a reversibly rotatable element connected to said lens element for moving said lens element in a first axial direction when said rotatable element is rotated in a first rotational direction and for moving said lens element in a second axial direction when said rotatable element is rotated in a second rotational direction, the combination therewith comprising:

a. a continuously rotating unidirectional drive means;
b. a first engagement element movable between an operative position in engagement with said reversibly rotatable element and an inoperative position disengaged from said reversibly rotatable element;
c. a second engagement element movable between an operative position in engagement with said reversibly rotatable element and in inoperative position disengaged from said reversibly rotatable element;
d. actuator means connected to said first and second engagement elements for moving a selected one of said first and second engagement elements from its normally inoperative position into its operative position while the other of said first and second engagement elements remains in its normally inoperative position and for returning said selected one of said first and second engagement elements to its inoperative position; and
e. operating means driven by said drive means for imparting motion to said first and second engagement elements, said first engagement element having reciprocative motion when in its operative position advancing said reversibly rotatable element in said first rotational direction by driving engagement with said reversibly rotatable element during each reciprocation of said first engagement element in one direction and experiencing non-driving engagement with said reversibly rotatable element during each reciprocation in the opposite direction, said second engagement element having reciprocative motion when in its operative position advancing said reversibly rotatable element in said second rotational direction by driving engagement with said reversibly rotatable element during each reciprocation of said second engagement element in one direction and experiencing non-driving engagement with said reversibly rotatable element during each reciprocation in the opposite direction, whereby said reversibly rotatable element is intermittently rotated in said first rotational direction when said first engagement element is in its operative position and said reversibly rotatable element is intermittently rotated in said second rotational direction when said second engagement element is in its operative position.

9. The invention defined in claim 8 wherein said operating means comprises an eccentric rotatably driven by said drive means.

10. The invention defined in claim 9 wherein said actuator means includes resilient means normally maintaining said first and second engagement elements in said inoperative position.

11. The invention of claim 10 wherein said actuator means includes a manually operable actuator lever resiliently connected to said first and second engagement elements for effecting said movement of a selected one of said first and second engagement elements into its operative position.

12. The invention defined in claim 1 wherein said actuator means includes a manually operable actuator lever resiliently connected to said first and second pawl engagement elements for effecting movement of a selected one of said first and second pawl engagement elements into its operative position.

13. The invention defined in claim 1 wherein said eccentric means comprises an eccentric hub driven by said rotating drive means, said ratchet pawl being slidably mounted on said eccentric hub through a central axial bore in said ratchet pawl.

14. The invention defined in claim 1 wherein the said actuator means is movable from its neutral position to a forward position where said first engagement element engages said track drive means to drive said lens element in a forward axial direction and said actuator means is movable from its neutral position to a reverse position where said second engagement element engages said track drive means to drive said lens element in a reverse axial direction.

15. In a camera having a zoom lens including a lens element movable in an axial direction, a reversibly rotatable element connected to the lens element, said lens element being movable in a forward axial direction when said rotatable element is rotated in a first rotational direction and in a reverse axial direction when said rotatable element is rotated in a second rotational direction, and means connecting said reversibly rotatable element to said lens element for converting a rotary motion of said reversibly rotatable element in said first rotational direction to axial motion of the lens element to advance said lens element in said forward axial direction and for converting a rotary motion of said reversibly rotatable element in said second rotational direction to axial motion of the lens element to advance said lens element in said reverse axial direction, the combination therewith comprising:
   a. a undirectional continuously rotating drive means;
   b. annular toothed track means affixed to said rotatable element;
   c. ratchet pawl means spaced from said annular toothed track means, said ratchet pawl means including:
      i. a first pawl engagement element movable between an operative position in engagement with said annular toothed track means and an inoperative position disengaged from said annular toothed track means, and
      ii. a second pawl engagement element movable between an operative position in engagement with said annular toothed track means and an inoperative position disengaged from said annular toothed track means;
   d. actuator means connected to said ratchet pawl means for moving a selected one of said first and second engagement elements from its inoperative position into operative position while the other of said first and second engagement elements remains in its inoperative position and for returning said selected one of said first and second engagement elements to its inoperative position, said actuator means having a neutral position in which both said first and second engagement elements are in their inoperative position, said actuator means including a manually operable actuator lever resiliently connected to said first and second pawl engagement elements for effecting movement of a selected one of said first and second pawl engagement elements into its operative position;
   e. means continuously biasing said actuator means to said neutral position; and
   f. an eccentric driven by said drive means for imparting back and forth motion to said ratchet pawl means such that said first pawl engagement element is effective when in its operative position to rotate said reversibly rotatable element intermittently in said first rotational direction and thereby advance said lens element in said forward axial direction and such that said second pawl engagement element is effective when in its operative position to rotate said reversibly rotatable element intermittently in said second rotational direction and thereby advance said lens element in said reverse axial direction, said eccentric means comprising an eccentric hub driven by said rotating drive means, and said ratchet pawl means being slidably mounted on said eccentric hub through a central axial bore in said ratchet pawl means.

16. In an optical instrument having a lens element movable in an axial direction, a reversibly rotatable element connected to said lens element, said lens element being movable in a first axial direction when said rotatable element is rotated in a first rotational direction and in a second axial direction when said rotatable element is rotated in a second rotational direction, and means connecting said reversibly rotatable element to said lens element for converting a rotary motion of said reversibly rotatable element in said first rotational direction to axial motion of the lens element to advance said lens element in said first axial direction and for converting a rotary motion of said reversibly rotatable element in said second rotational direction to axial motion of the lens element to advance said lens element in said second axial direction, the combination therewith comprising:
   a. a undirectional continuously rotating drive means;
   b. annular toothed track means affixed to said rotatable element;
   c. ratchet pawl means spaced from said annular toothed track means, said ratchet pawl means including:
      i. a first pawl engagement element movable between an operative position in engagement with said annular toothed track means and an inoperative position disengaged from said annular toothed track means; and
      ii. a second pawl engagement element movable between an operative position in engagement with said annular toothed track means and an inoperative position disengaged from said annular toothed track means;
   d. actuator means connected to said ratchet pawl means for moving a selected one of said first and second engagement elements from its inoperative position into operative position while the other of said first and second engagement elements remains in its inoperative position and for returning said selected one of said first and second engagement elements to its inoperative position, said actuator means having a neutral position in which both said first and second engagement elements are in their inoperative position; and
   e. an eccentric driven by said drive means for imparting back and forth motion to said ratchet pawl means such that said first pawl engagement element is effective when in its operative position to rotate said reversibly rotatable element intermittently in said first rotational direction and thereby advance said lens element in said first axial direction and such that said second pawl engagement element is effective when in its operative position to rotate said reversibly rotatable element intermittently in said second rotational direction and thereby advance said lens element in said second axial direction, said eccentric means comprising an eccentric hub driven by said rotating drive means and said ratchet pawl means being slidably mounted on said eccentric hub through a central axial bore in said ratchet pawl means.

17. The invention defined in claim 16 wherein the said actuator means is movable from its neutral position to a forward position where said first engagement element engages said track drive means to drive said lens element in a forward axial direction and said actuator means is movable from its neutral position to a reverse position where said second engagement element engages said track drive means to drive said lens element in a reverse axial direction.

18. The invention defined in claim 16 wherein said actuator means includes a manually operable actuator lever resiliently connected to said first and second pawl engagement elements for effecting movement of a selected one of said first and second pawl engagement elements into its operative position.

19. In an optical instrument having a lens element movable in an axial direction, a reversibly rotatable element connected to said lens element, said lens element being movable in a first axial direction when said rotatable element is rotated in a first rotational direction and in a second axial direction when said rotatable element is rotated in a second rotational direction, and means connecting said reversibly rotatable element to said lens element for converting a rotary motion of said reversibly rotatable element in said first rotational direction to axial motion of the lens element to advance said lens element in said first axial direction and for converting a rotary motion of said reversibly rotatable element in said second rotational direction to axial motion of the lens element to advance said lens element in said second axial direction, the combination therewith comprising:

a. a unidirectional continuously rotating drive means;
b. annular toothed track means affixed to said rotatable element;
c. ratchet pawl means spaced from said annular toothed track means, said ratchet pawl means including:
  i. a first pawl engagement element movable between an operative position in engagement with said annular toothed track means and an inoperative position disengaged from said annular toothed track means, and
  ii. a second pawl engagement element movable between an operative position in engagement with said annular toothed track means and an inoperative position disengaged from said annular toothed track means;
d. actuator means connected to said ratchet pawl means for moving a selected one of said first and second engagement elements from its inoperative position into operative position while the other of said first and second engagement elements remains in its inoperative position and for returning said selected one of said first and second engagement elements to its inoperative position, said actuator means having a neutral position in which both said first and second engagement elements are in their inoperative position and including a manually operable actuator lever resiliently connected to said first and second pawl engagement elements for effecting movement of a selected one of said first and second pawl engagement elements into its operative position;
e. an eccentric driven by said drive means for imparting back and forth motion to said ratchet pawl means such that said first pawl engagement element is effective when in its operative position to rotate said reversibly rotatable element intermittently in said first rotational direction and thereby advance said lens element in said first axial direction and such that said second pawl engagement element is effective when in its operative position to rotate said reversibly rotatable element intermittently in said second rotational direction, and thereby advance said lens element in said second axial direction.

20. The invention defined in claim 19 wherein the said actuator means is movable from its neutral position to a forward position where said first engagement element engages said track drive means to drive said lens element in a forward axial direction and said actuator means is movable from its neutral position to a reverse position where said second engagement element engages said track drive means to drive said lens element in a reverse axial direction.

* * * * *